Aug. 2, 1932.   O. BURHEIM   1,869,462
STRETCHING AND FASTENING DEVICE FOR ROPES
Filed Feb. 27, 1930
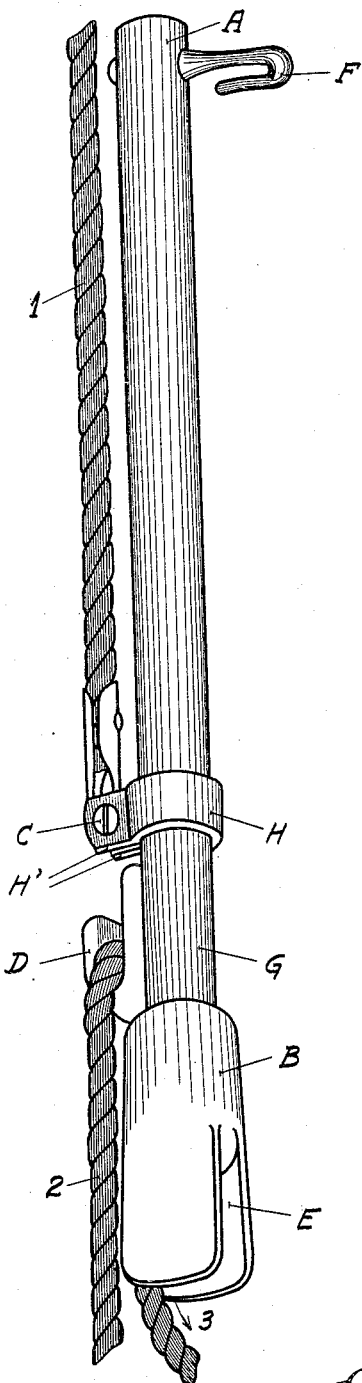
INVENTOR
Olav Burheim Patented Aug. 2, 1932

1,869,462

UNITED STATES PATENT OFFICE

OLAV BURHEIM, OF TRONDHJEM, NORWAY

STRETCHING AND FASTENING DEVICE FOR ROPES

Application filed February 27, 1930, Serial No. 431,918, and in Norway January 25, 1929.

This invention relates to a stretching device, serving at the same time as a fastening device. The device consists of a lever to which one end of the rope is fastened and the other end of the rope is inserted in a suitable manner in the bifurcated lower end of the lever. By turning the lever around a pin of the clip as the fulcrum, the rope will be stretched and at the same time held taut. In the swivelled position the stretching lever is held by a hook hooked into the rope and arranged in the upper end of the lever.

An embodiment of the invention is illustrated by way of example in the only figure of the accompanying drawing which shows the device in perspective view.

The stretching device consists of a lever A, B on which a clip H is slidably fastened, the clip being preferably made as a bow surrounding the lever and adapted to be clamped fast by means of a screw bolt C, to which one end of the rope 1 is fastened. The end B of the lever is bifurcated at E to form a crotch, and when the stretching device is in use, the other end 2 of the rope is placed around a hook D fastened on the lever below the clip H and then inserted in the bifurcation E, as indicated by the arrow 3.

The end A of the lever A, B is now swivelled down around the pin C as a fulcrum, and during this swivelling the part 2 of the rope is caused to enter the bifurcation, wherein the rope part 3 is already located. Consequently part 2 will exert a pressure on part 3 so as to maintain it in safe frictional contact with the bottom of the bifurcation. The lever is maintained in its stretching position by a hook F on the upper lever end A, which hook is hooked on the rope part 2.

As the part 2 of the rope enters the bifurcation E, when the lever is turned and thereby exerts a pressure on the part 3 of the rope, the rope will be held taut.

Instead of placing the rope round the hook D it may be wound round the rod at G, and instead of inserting the end 3 of the rope in bifurcation E, it may be placed transversely between the bifurcation E and the part 2 of the rope, when only the part 2 of the rope enters the bifurcation E on the lever being swivelled.

The invention is not restricted to the constructional form shown in the drawing. Thus for example instead of the arrangement of the bifurcation on the end of the lever the lever may be simply provided with a cut-out portion or an open groove.

Obviously the pin C, to which the end 1 of the rope is fastened, directly or through a metal bow or loop, may also be arranged on the lever between the hook D and the bifurcation bottom, although the construction shown is preferred.

In order to regulate the stretching force, the clip is slidable on the lever. Of course, the hook F need not be in direct connection with the lever end A. More suitably the hook F may be connected therewith by means of a short chain, as is obvious.

I claim:

1. A stretching and fastening device for ropes, comprising a lever having a bifurcation at an end, a clip adjustably mounted on the lever and adapted for fastening one rope end to the lever, a hook connected with the other end of the lever, and a hook on the lever between the clip and the bifurcation and arranged to hold a bight of another rope end.

2. A stretching and fastening device for ropes, comprising a lever, means for fastening a rope end to the lever, a rest on the lever adapted to hold a bight of another rope end, said lever having an open groove adapted to so receive a branch of the rope bight that said branch is caused to press the other branch in frictional contact with the device between said rest and said open groove.

3. A device as claimed in claim 2, in which the means for fastening the end of the rope to the lever is adjustable longitudinally on the lever, for the purpose set forth.

4. A stretching and fastening device for ropes, comprising a lever, means for fastening a rope end to the lever, a rest on the lever adapted to hold a bight of another rope end, and a crotch provided on the lever on the side of the rest opposite to the said rope end fastening means and adapted to so receive a branch of the rope bight that said branch is adapted to press the other branch in frictional contact with the bottom of the crotch, the end of the lever located on the side of the fastening means opposite the rest and the crotch being provided with a hook adapted to be hooked onto the rope to hold said lever in stretching position.

In testimony whereof I affix my signature.

OLAV BURHEIM.